US008487571B2

(12) United States Patent
Chang et al.

(10) Patent No.: US 8,487,571 B2
(45) Date of Patent: Jul. 16, 2013

(54) ZERO-CROSSING DETECTION CIRCUIT AND COMMUTATION DEVICE USING THE ZERO-CROSSING DETECTION CIRCUIT

(75) Inventors: Wei-Hsu Chang, New Taipei (TW); Pei-Cheng Huang, Taipei (TW); Hao-Yu Chang, New Taipei (TW); Yen-Shin Lai, Taipei (TW); Kuo-Chung Lee, New Taipei (TW); Jo-Yu Wang, New Taipei (TW); Yu-Kuang Wu, Hsinchu County (TW); Chih-Chang Chen, New Taipei (TW); Shiue-Shr Jiang, Changhua County (TW); Jen-Hung Chi, Taichung (TW)

(73) Assignee: Richtek Technology Corp., Zhubei (TW)

( * ) Notice: Subject to any disclaimer, the term of this patent is extended or adjusted under 35 U.S.C. 154(b) by 142 days.

(21) Appl. No.: 13/232,086

(22) Filed: Sep. 14, 2011

(65) Prior Publication Data

US 2012/0326647 A1    Dec. 27, 2012

(30) Foreign Application Priority Data

Jun. 21, 2011   (TW) ................................ 10121663 A

(51) Int. Cl.
*H02P 6/18* (2006.01)
(52) U.S. Cl.
USPC ..................................................... 318/400.35
(58) Field of Classification Search
USPC ................. 318/572, 400.35, 254.1, 439, 602, 318/695, 733, 738, 244
See application file for complete search history.

(56) References Cited

U.S. PATENT DOCUMENTS

| 2004/0070356 A1* | 4/2004 | Masino .......................... 318/439 |
| 2004/0263104 A1* | 12/2004 | Iwanaga et al. ............... 318/439 |
| 2007/0194731 A1* | 8/2007 | Fukamizu et al. ............ 318/254 |
| 2008/0238349 A1* | 10/2008 | Cheng ....................... 318/400.05 |
| 2010/0007297 A1* | 1/2010 | Brown et al. ............. 318/400.32 |
| 2010/0295490 A1* | 11/2010 | Kuroshima et al. ...... 318/400.35 |
| 2011/0074322 A1* | 3/2011 | Hsu .......................... 318/400.21 |
| 2011/0084640 A1* | 4/2011 | Brown ..................... 318/400.35 |
| 2011/0241588 A1* | 10/2011 | Tseng et al. ............. 318/400.35 |
| 2012/0001574 A1* | 1/2012 | Akaishi et al. ........... 318/400.04 |

OTHER PUBLICATIONS

P. Damodharan, "Indirect Back-EMF Zero Crossing Detection for Sensorless BLDC Motor Operation," Department of Electrical Engineering Department of Electrical Engineering Indian Institute of Technology Madras, Chennai, India, 0-7803-9296-5, pp. 1107-1111, 2005 IEEE.*
Taeyeon Kim, "A New Sensorless Drive Scheme for a BLDC Motor Based on the Terminal Voltage Difference," Department of Electronics Engineering, Chungnam National University, Daejeon, South Korea, 978-1-61284-972-0, pp. 1710-1715, 2011 IEEE.*

* cited by examiner

*Primary Examiner* — Walter Benson
*Assistant Examiner* — Said Bouziane
(74) *Attorney, Agent, or Firm* — WPAT, PC; Justin King

(57) ABSTRACT

A zero-crossing detection circuit and a commutation device using the zero-crossing detection circuit are provided. The zero-crossing detection circuit is adapted into a three-phase brushless DC (direct current) motor with first to third coils. One terminal of each of the first to third coils is electrically coupled together with each other. The detection circuit comprises a first selection circuit, a second selection circuit and a comparator. The first selection circuit and the second selection circuit are both electrically coupled to another terminals of the first to third coils, to obtain first to third terminal voltages, and output one of the first to third terminal voltages according to a selection signal. The comparator is configured for comparing an output of the first selection circuit and an output of the second selection circuit, to output a comparing result.

8 Claims, 5 Drawing Sheets ly according to the selection signal in a third period and a sixth period.

ZERO-CROSSING DETECTION CIRCUIT AND COMMUTATION DEVICE USING THE ZERO-CROSSING DETECTION CIRCUIT

TECHNICAL FIELD

The present invention relates to the field in relation to the three-phase brushless DC (direct current) motor, and more particularly to a zero-crossing detection circuit adapted into a three-phase brushless DC motor, and a commutation device using the zero-crossing detection circuit.

BACKGROUND

Conventional commutation device adapted into three-phase brushless DC (direct current) motor is configured for obtaining dynamic positions of rotor of the motor according to counter electro-dynamic potential of three-phase excitation coil of the motor and neutral-point voltage of the three-phase excitation coil, to further provide corresponding excitation current to the three-phase excitation coil, such that the motor continuously operate. However, zero-crossing detection circuit of the conventional commutation device is very complex in the circuit design, and the size thereof is very large, which will be described in FIG. 1.

FIG. 1 is a circuit view of a conventional zero-crossing detection circuit. As shown in FIG. 1, the circuit structure as marked by labels 19 and 21 comprises three same circuits, and all of the three same circuits need to use the neutral-point voltage of the three-phase excitation coil (that is, the voltage of the node N). In addition, from FIG. 1 it can be seen that, each of coils of the three-phase excitation coil needs to cooperate with a corresponding one of the three same circuits to operate.

From the above description it can be seen that, the conventional zero-crossing detection circuit is very complex in design, such that the size thereof is very large.

SUMMARY

Therefore, an object of the present invention is to provide a zero-crossing detection circuit adapted into a three-phase brushless DC motor. The circuit of the zero-crossing detection circuit is simple, such that the size of the zero-crossing detection circuit is small.

Another object of the present invention is also to provide a commutation device using the above zero-crossing detection circuit.

The present invention provides a zero-crossing detection circuit adapted into a three-phase brushless DC (direct current) motor. The three-phase brushless DC motor comprises a first coil, a second coil and a third coil. A terminal of the first coil, a terminal of the second coil and a terminal of the third coil are electrically coupled together with each other. The zero-crossing detection circuit comprises a first selection circuit, a second selection circuit and a comparator. The first selection circuit is electrically coupled to another terminal of the first coil, another terminal of the second coil and another terminal of the third coil, to obtain a first-terminal voltage, a second-terminal voltage and a third-terminal voltage respectively, and output one of the first-terminal voltage, the second-terminal voltage and the third-terminal voltage according to a selection signal. The second selection circuit is electrically coupled to the another terminal of the first coil, the another terminal of the second coil and the another terminal of the third coil, to obtain the first-terminal voltage, the second-terminal voltage and the third-terminal voltage respectively, and output one of the first-terminal voltage, the second-terminal voltage and the third-terminal voltage according to the selection signal. The comparator is configured for comparing an output of the first selection circuit and an output of the second selection circuit, to output a comparing result.

The present invention also provides a commutation device adapted into a three-phase brushless DC motor. The three-phase brushless DC motor comprises a first coil, a second coil and a third coil. A terminal of the first coil, a terminal of the second coil and a terminal of the third coil are electrically coupled together with each other. The commutation device comprises a zero-crossing detection circuit and a driving circuit. The zero-crossing detection circuit comprises a first selection circuit, a second selection circuit and a comparator. The first selection circuit is electrically coupled to another terminal of the first coil, another terminal of the second coil and another terminal of the third coil, to obtain a first-terminal voltage, a second-terminal voltage and a third-terminal voltage respectively, and output one of the first-terminal voltage, the second-terminal voltage and the third-terminal voltage according to a selection signal. The second selection circuit is electrically coupled to the another terminal of the first coil, the another terminal of the second coil and the another terminal of the third coil, to obtain the first-terminal voltage, the second-terminal voltage and the third-terminal voltage respectively, and output one of the first-terminal voltage, the second-terminal voltage and the third-terminal voltage according to the selection signal. The comparator is configured for comparing an output of the first selection circuit and an output of the second selection circuit, to output a comparing result. The driving circuit is electrically coupled to the another terminal of the first coil, the another terminal of the second coil and the another terminal of the third coil, to provide excitation currents of the first coil, the second coil and the third coil according to the comparing result.

In an exemplary embodiment of the present invention, the zero-crossing detection circuit further comprises a first low-pass filter and a second low-pass filter. The first low-pass filter is electrically coupled between an output terminal of the first selection circuit and the comparator. The second low-pass filter is electrically coupled between an output terminal of the second selection circuit and the comparator.

In an exemplary embodiment of the present invention, the zero-crossing detection circuit further comprises a first low-pass filter, a second low-pass filter and a third low-pass filter. The first low-pass filter is electrically coupled between the another terminal of the first coil and the first selection circuit, and also electrically coupled between the another terminal of the first coil and the second selection circuit. The second low-pass filter is electrically coupled between the another terminal of the second coil and the first selection circuit, and also electrically coupled between the another terminal of the second coil and the second selection circuit. The third low-pass filter is electrically coupled between the another terminal of the third coil and the first selection circuit, and also electrically coupled between the another terminal of the third coil and the second selection circuit.

In an exemplary embodiment of the present invention, the first selection circuit and the second selection circuit output the third-terminal voltage and the first-terminal voltage respectively according to the selection signal in a first period and a fourth period. The first selection circuit and the second selection circuit output the second-terminal voltage and the third-terminal voltage respectively according to the selection signal in a second period and a fifth period. The first selection circuit and the second selection circuit output the first-terminal voltage and the second-terminal voltage respectively according to the selection signal in a third period and a sixth period. If the first selection circuit and the second selection circuit output the first-terminal voltage and the second-terminal voltage respectively in the first period, the second period, the third period, the fourth period, the fifth period and the sixth period, the comparing result presents the first-terminal voltage is larger than the second-terminal voltage in the first period, the second period and the third period, and presents the first-terminal voltage is less than the second-terminal voltage in the fourth period, the fifth period and the sixth period. If the first selection circuit and the second selection circuit output the second-terminal voltage and the third-terminal voltage respectively in the first period, the second period, the third period, the fourth period, the fifth period and the sixth period, the comparing result presents the second-terminal voltage is less than the third-terminal voltage in the first period, the second period and the sixth period, and presents the second-terminal voltage is larger than the third-terminal voltage in the third period, the fourth period and the fifth period. If the first selection circuit and the second selection circuit output the third-terminal voltage and the first-terminal voltage respectively in the first period, the second period, the third period, the fourth period, the fifth period and the sixth period, the comparing result presents the third-terminal voltage is larger than the first-terminal voltage in the first period, the fifth period and the sixth period, and presents the third-terminal voltage is less than the first-terminal voltage in the second period, the third period and the fourth period.

The present invention essentially comprises two selection circuits and one comparator, and employs the two selection circuits to output one of the terminal voltages of the three coils respectively, such that the comparator may compare the outputs of the two selection circuits to output a comparing result. The comparing result is presented by pulses, and rising edges and falling edges of the pulses may be used as commutation points. Thus the circuit of the present invention is simple, and the size of the zero-crossing detection circuit of the present invention is largely less than that of the conventional zero-crossing detection circuit.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
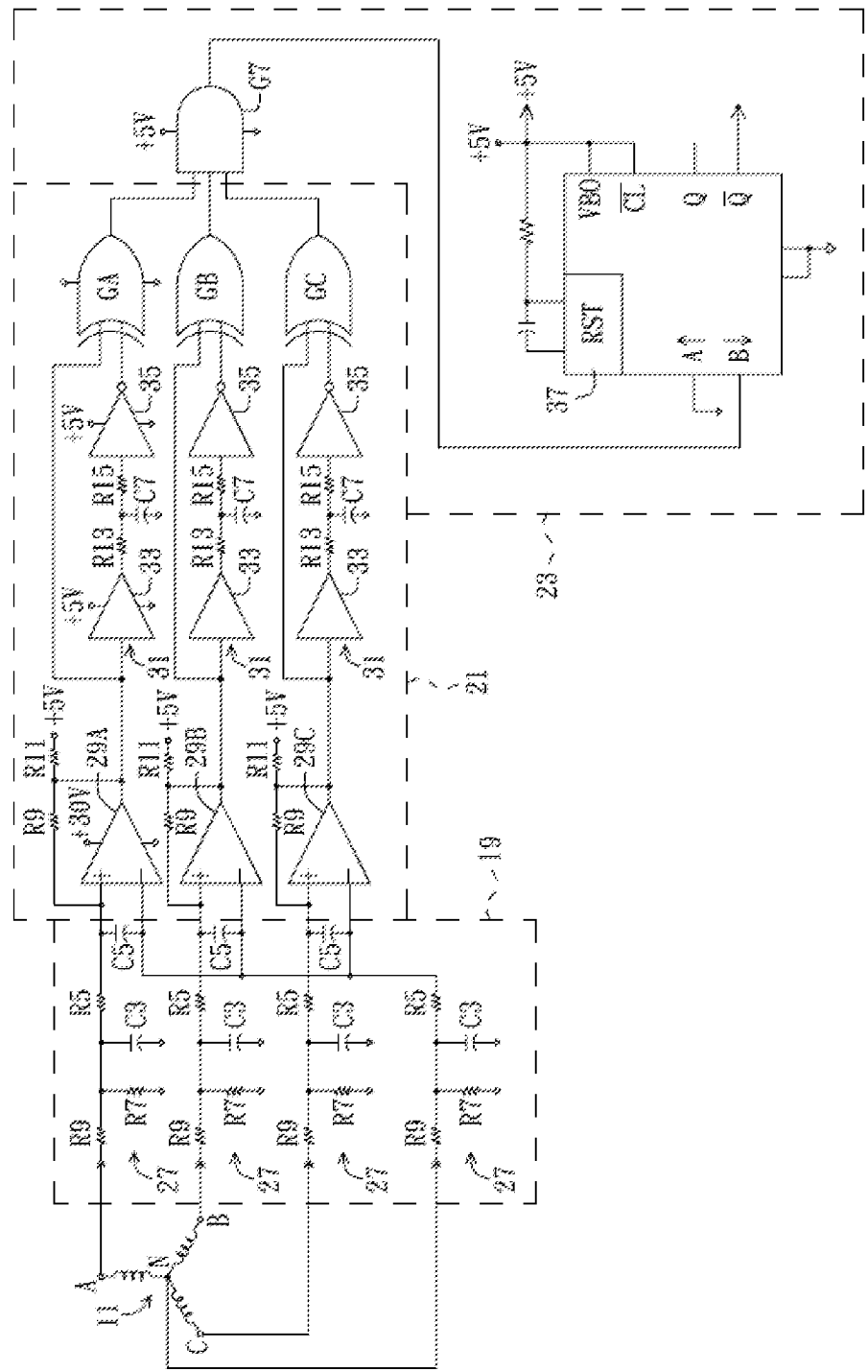
FIG. 1 is a circuit view of a conventional zero-crossing detection circuit.
Figure 2:
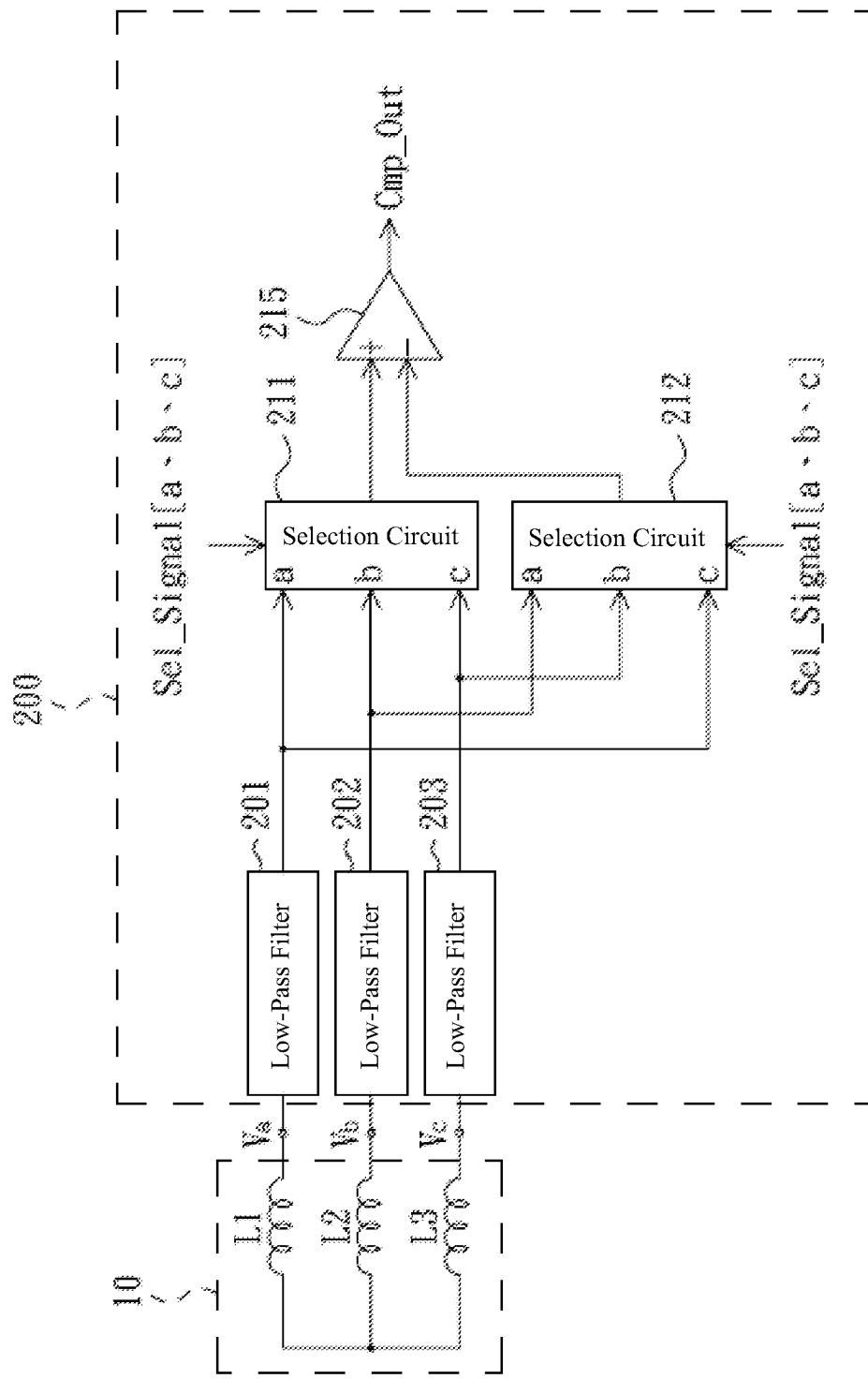
FIG. 2 is a schematic view of a zero-crossing detection circuit in accordance with a first exemplary embodiment of the present invention.

FIG. 2 is a schematic view of a zero-crossing detection circuit in accordance with a first exemplary embodiment of the present invention. The zero-crossing detection circuit 200 is adapted into a three-phase brushless DC motor 10, and the three-phase brushless DC motor 10 has a first coil L1, a second coil L2 and a third coil L3. A terminal of the first coil L1, a terminal of the second coil L2 and a terminal of the third coil L3 are electrically coupled together with each other. The zero-crossing detection circuit 200 comprises a low-pass filter 201, a low-pass filter 202, a low-pass filter 203, a first selection circuit 211, a second selection circuit 212 and a comparer 215. In the exemplary embodiment, each of the first selection circuit 211 and the second selection circuit 212 may be a multiplexer, and the present invention is not limited herein.

The low-pass filter 201 is electrically coupled between another terminal of the first coil L1 and the first selection circuit 211, and also electrically coupled between the another terminal of the first coil L1 and the second selection circuit 212. The low-pass filter 202 is electrically coupled between another terminal of the second coil L2 and the first selection circuit 211, and also electrically coupled between the another terminal of the second coil L2 and the second selection circuit 212. The low-pass filter 203 is electrically coupled between another terminal of the third coil L3 and the first selection circuit 211, and also electrically coupled between the another terminal of the third coil L3 and the second selection circuit 212. The first selection circuit 211 is electrically coupled to an output terminal of the low-pass filter 201, an output terminal of the low-pass filter 202, and an output terminal of the low-pass filter 203, to obtain a first-terminal voltage Va, a second-terminal voltage Vb and a third-terminal voltage Vc through the three low-pass filters, and output one of the first-terminal voltage Va, the second-terminal voltage Vb and the third-terminal voltage Vc according to a selection signal Sel_Signal [a, b, c].

The second selection circuit 212 is also electrically coupled to the output terminal of the low-pass filter 201, the output terminal of the low-pass filter 202 and the output terminal of the low-pass filter 203, to obtain the first-terminal voltage Va, the second-terminal voltage Vb and the third-terminal voltage Vc through the three low-pass filters respectively, and output one of the first-terminal voltage Va, the second-terminal voltage Vb and the third-terminal voltage Vc according to the selection signal Sel_Signal [a, b, c]. The comparator 215 is configured for comparing the output of the first selection circuit 211 and the output of the first selection circuit 212, to output a comparing result Cmp_Out.

Figure 3:
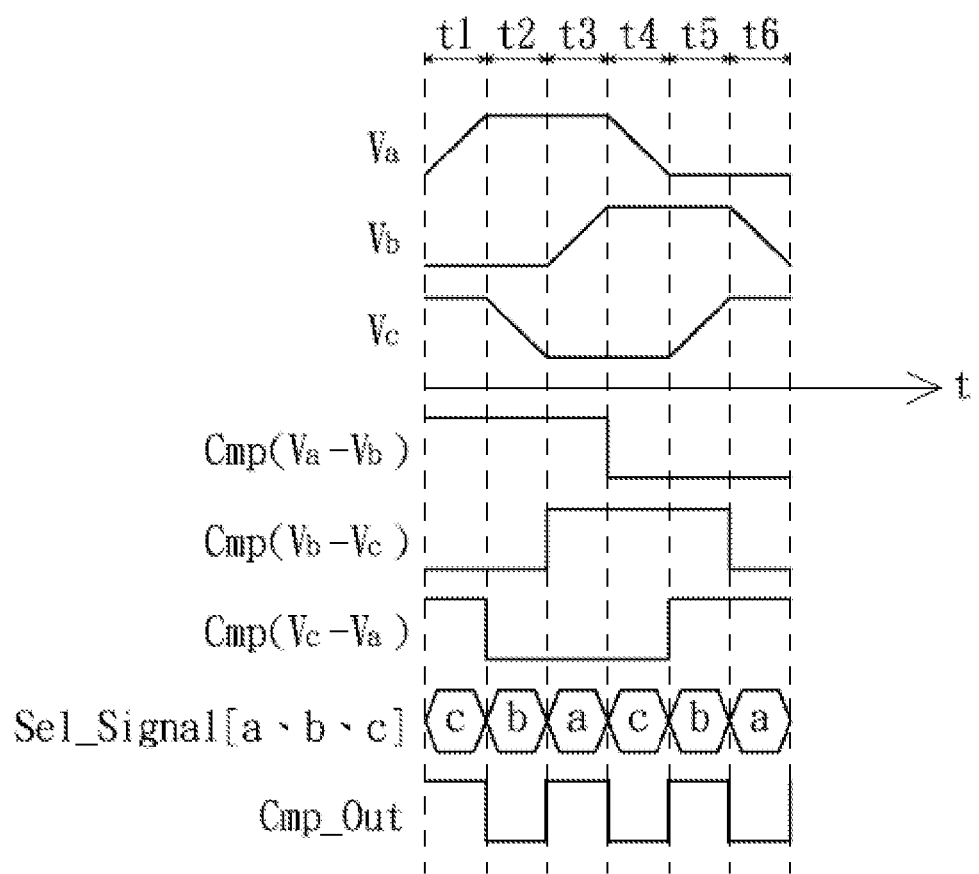
FIG. 3 is a time-sequence view of the terminal voltages of the three coils of FIG. 2.

FIG. 3 is a time-sequence view of the terminal voltages of the three coils of FIG. 2. In FIG. 3, labels Va, Vb and Vc represent the first-terminal voltage, the second-terminal voltage and the third-terminal voltage of FIG. 2 respectively, a label Cmp(Va-Vb) represents a comparing result generated by comparing the first-terminal voltage Va (received by a positive input terminal of the comparator 215) and the second-terminal voltage Vb (received by a negative input terminal of the comparator 215) by the comparator 215, a label Cmp(Vb-Vc) represents a comparing result generated by comparing the second-terminal voltage Vb (received by the positive input terminal of the comparator 215) and the third-terminal voltage Vc (received by the negative input terminal of the comparator 215) by the comparator 215, and a label Cmp(Vc-Va) represents a comparing result generated by comparing the third-terminal voltage Vc (received by the positive input terminal of the comparator 215) and the first-terminal voltage Va (received by the negative input terminal of the comparator 215) by the comparator 215. A label Cmp_Out represents an actual comparing result of the comparator 215 as shown in FIG. 2.

From FIG. 3 it can be seen that, if the first selection circuit 211 and the second selection circuit 212 output the first-terminal voltage Va and the second-terminal voltage Vb respectively in periods t1-t6, the comparing result Cmp_Out outputted from the comparator 215 presents the first-terminal voltage Va is larger than the second-terminal voltage Vb in a first period t1, a second period t2 and a third period t3, and presents the first-terminal voltage Va is less than the second-terminal voltage Vb in a fourth period t4, a fifth period t5 and a sixth period t6.

If the first selection circuit 211 and the second selection circuit 212 output the second-terminal voltage Vb and the third-terminal voltage Vc respectively in the period t1~t6, the comparing result Cmp_Out outputted from the comparator 215 presents the second-terminal voltage Vb is less than the third-terminal voltage Vc in the first period t1, the second period t2 and the sixth period t3. The comparing result Cmp_Out outputted from the comparator 215 presents the second-terminal voltage Vb is larger than the third-terminal voltage Vc in the third period t3, the fourth period t4 and the fifth period t5.

In addition, if the first selection circuit 211 and the second selection circuit 212 output the third-terminal voltage Vc and the first-terminal voltage Va respectively in the period t1~t6, the comparing result Cmp_Out outputted from the comparator 215 presents the third-terminal voltage Vc is larger than the first-terminal voltage Va in the first period t1, the fifth period t5 and the sixth period t6, and presents the third-terminal voltage Vc is less than the first-terminal voltage Va in the second period t2, the third period t3 and the fourth period t4.

Referring to FIG. 3 and FIG. 2 together, in the exemplary embodiment, the first selection circuit 211 and the second selection circuit 212 output the third-terminal voltage Vc and the first-terminal voltage Va respectively according to the selection signal Sel_Signal [c] in the first period t1 and the fourth period t4. The first selection circuit 211 and the second selection circuit 212 output the second-terminal voltage Vb and the third-terminal voltage Vc respectively according to the selection signal Sel_Signal [b] in the second period t2 and the fifth period t5. The first selection circuit 211 and the second selection circuit 212 output the first-terminal voltage Va and the second-terminal voltage Vb respectively according to the selection signal Sel_Signal [a] in the third period t3 and the sixth period t6. Therefore, rising edges and falling edges of pulses of the comparing result Cmp_Out may be used as commutation points.

From the above description it can be seen that, the zero-crossing detection circuit of the present invention is essentially consisted of two selection circuits and one comparator, and employs the two selection circuits to output one of the terminal voltages of the three coils respectively, such that the comparator may compare the outputs of the two selection circuits to output a comparing result. The comparing result is presented by pulses, and rising edges and falling edges of the pulses may be used as commutation points. Thus the circuit of the zero-crossing detection circuit of the present invention is simple, and the size of the zero-crossing detection circuit of the present invention is largely less than that of the conventional zero-crossing detection circuit.

Figure 4:
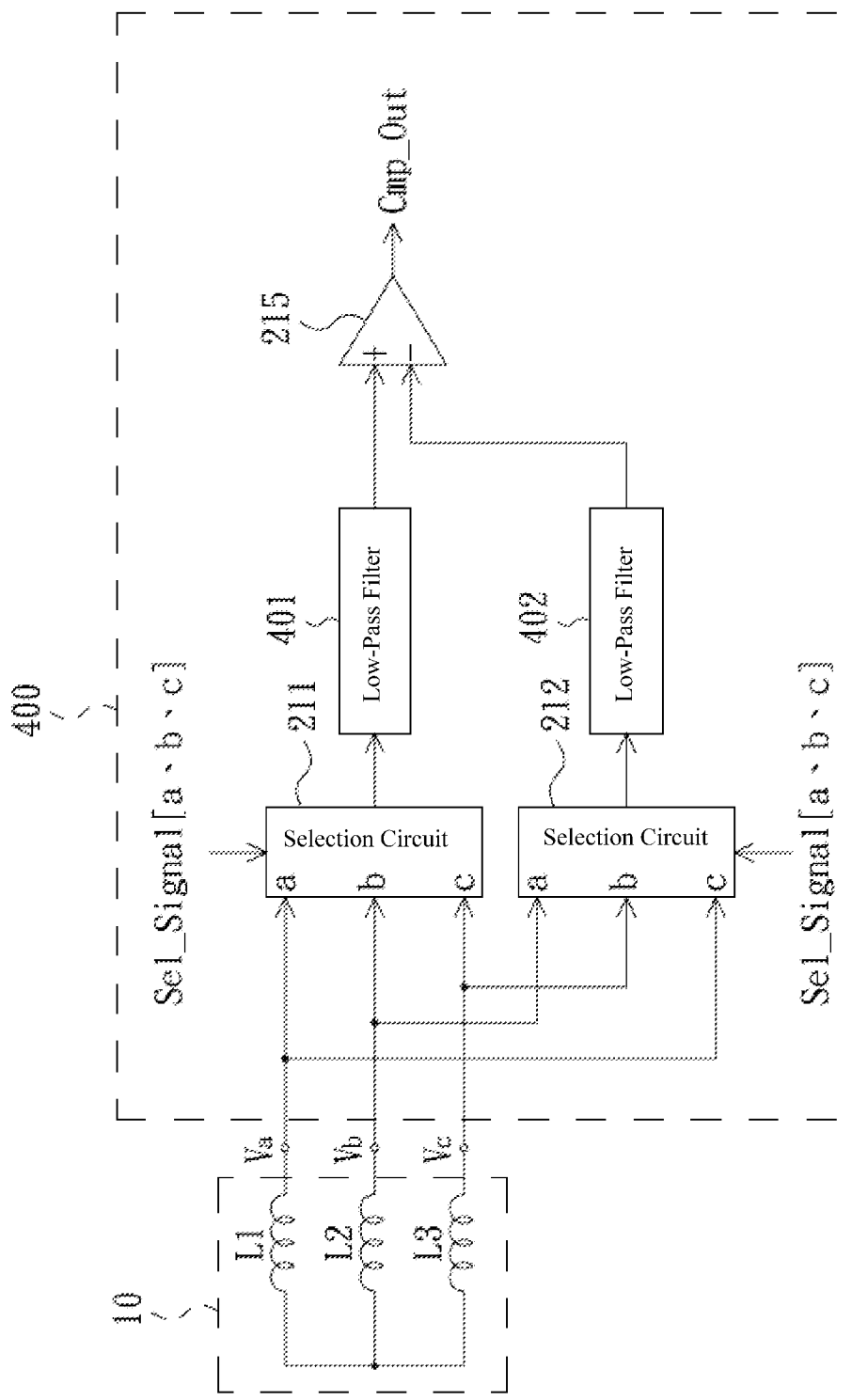
FIG. 4 is a schematic view of a zero-crossing detection circuit in accordance with a second exemplary embodiment of the present invention.

The present invention may amend partially as shown in FIG. 4 except of the circuit and the method described in the above exemplary embodiment. FIG. 4 is a schematic view of a zero-crossing detection circuit in accordance with a second exemplary embodiment of the present invention. Labels of FIG. 4 same to those of FIG. 2 represent same objects. The zero-crossing detection circuit 400 of FIG. 4 is similar with the zero-crossing detection circuit 200 of FIG. 2, except that the zero-crossing detection circuit 400 only employs two low-pass filters, such as the flow-pass filter 401 and the low-pass filter 402 as shown in FIG. 4. In the exemplary embodiment, the low-pass filter 401 is electrically coupled between the output terminal of the first selection circuit 211 and the comparator 215. The low-pass filter 402 is electrically coupled between the output terminal of the second selection circuit 212 and the comparator 215.

In addition, the first selection circuit 211 is electrically coupled to the another terminal of the first coil L1, the another terminal of the second coil L2 and the another terminal of the third coil L3 to obtain the first-terminal voltage Va, the second-terminal voltage Vb and the third-terminal voltage Vc respectively, and output one of the first-terminal voltage Va, the second-terminal voltage Vb and the third-terminal voltage Vc according to the selection signal Sel_Signal [a, b, c]. The second selection circuit 212 is electrically coupled to the another terminal of the first coil L1, the another terminal of the second coil L2 and the another terminal of the third coil L3 to obtain the first-terminal voltage Va, the second-terminal voltage Vb and the third-terminal voltage Vc respectively, and output one of the first-terminal voltage Va, the second-terminal voltage Vb and the third-terminal voltage Vc according to the selection signal Sel_Signal [a, b, c]. The comparator 215 is configured for receiving the outputs of the two low-pass filters to output the comparing result Cmp_Out.

Figure 5:
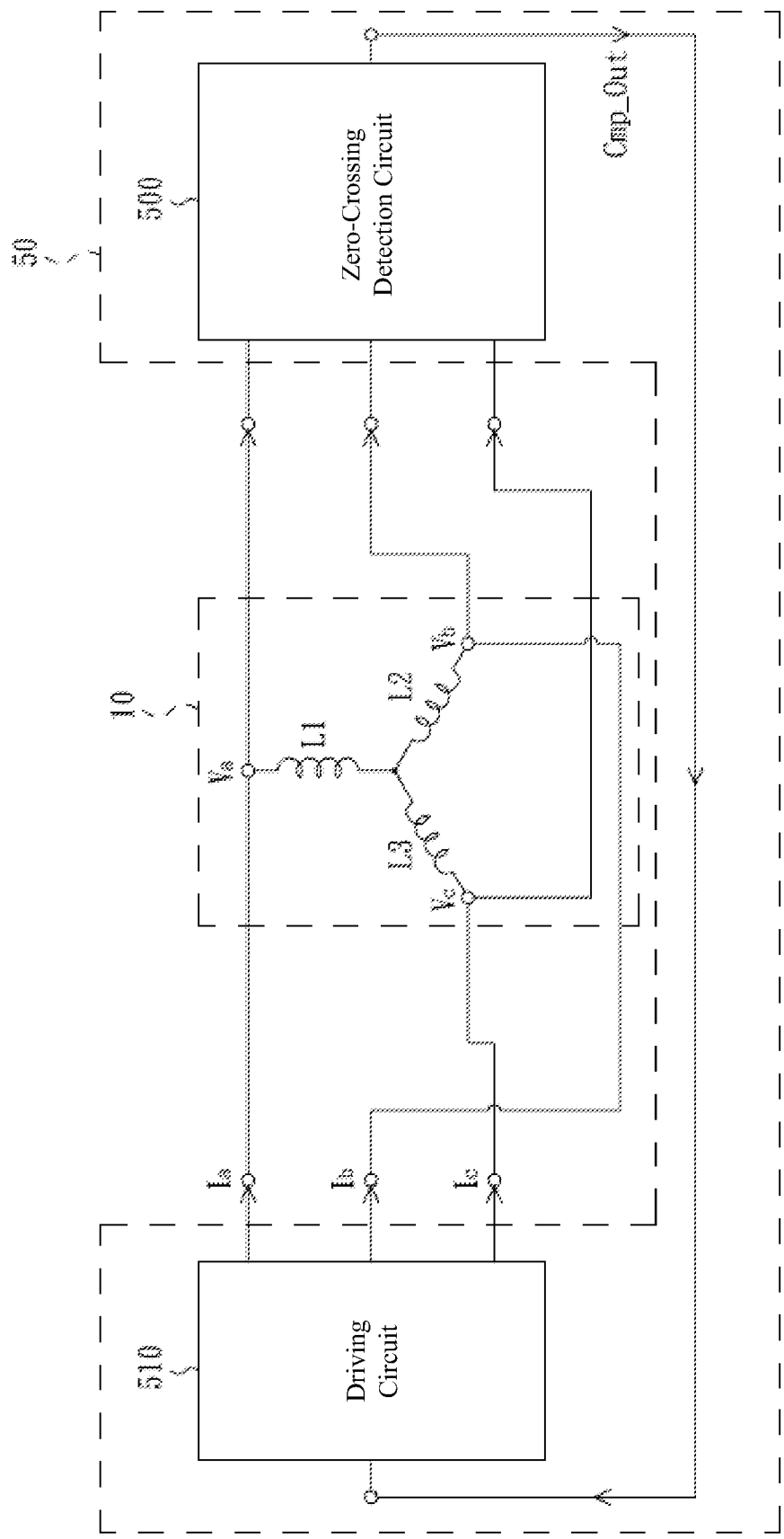
FIG. 5 is a schematic view of a commutation device using the zero-crossing detection circuit in accordance with an exemplary embodiment of the present invention.

FIG. 5 is a schematic view of a commutation device using the zero-crossing detection circuit in accordance with an exemplary embodiment of the present invention. As shown in FIG. 5, the commutation device 50 comprises a zero-crossing detection circuit 500 and a driving circuit 510. The zero-crossing detection circuit 500 may be the zero-crossing detection circuit of the first exemplary embodiment or the second exemplary embodiment. The driving circuit 510 is electrically coupled to the another terminal of the first coil L1 of a three-phase brushless DC motor 10, the another terminal of the second coil L2 and the another terminal of the third coil L3, and configured for providing an excitation current Ia of the first coil L1, an excitation current Ib of the second coil L2 and an excitation current Ic of the third coil L3 according to the comparing result Cmp_Out.

It should be noted that, although each of the first selection circuit 211 and the second selection circuit 212 is a multi-plexer in the above exemplary embodiments, each of the first selection circuit 211 and the second selection circuit 212 may be performed by a group of switchers respectively, and each of the switchers may be a transistor.

In summary, the present invention essentially comprises two selection circuits and one comparator, and employs the two selection circuits to output one of the terminal voltages of the three coils respectively, such that the comparator may compare the outputs of the two selection circuits to output a comparing result. The comparing result is presented by pulses, and rising edges and falling edges of the pulses may be used as commutation points. Thus the circuit of the present invention is simple, and the size of the zero-crossing detection circuit of the present invention is largely less than that of the conventional zero-crossing detection circuit.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A zero-crossing detection circuit adapted into a three-phase brushless DC (direct current) motor, the three-phase brushless DC motor comprising a first coil, a second coil and a third coil, a terminal of the first coil, a terminal of the second coil and a terminal of the third coil being electrically coupled together with each other, the zero-crossing detection circuit comprising:
   a first selection circuit electrically coupled to another terminal of the first coil, another terminal of the second coil and another terminal of the third coil, to obtain a first-terminal voltage, a second-terminal voltage and a third-terminal voltage respectively, and output one of the first-terminal voltage, the second-terminal voltage and the third-terminal voltage according to a selection signal;
   a second selection circuit electrically coupled to the another terminal of the first coil, the another terminal of the second coil and the another terminal of the third coil, to obtain the first-terminal voltage, the second-terminal voltage and the third-terminal voltage respectively, and output one of the first-terminal voltage, the second-terminal voltage and the third-terminal voltage according to the selection signal; and
   a comparator configured for comparing an output of the first selection circuit and an output of the second selection circuit, to output a comparing result.

2. The zero-crossing detection circuit according to claim 1, further comprising:
   a first low-pass filter electrically coupled between an output terminal of the first selection circuit and the comparator; and
   a second low-pass filter electrically coupled between an output terminal of the second selection circuit and the comparator.

3. The zero-crossing detection circuit according to claim 1, further comprising:
   a first low-pass filter electrically coupled between the another terminal of the first coil and the first selection circuit, and also electrically coupled between the another terminal of the first coil and the second selection circuit;
   a second low-pass filter electrically coupled between the another terminal of the second coil and the first selection circuit, and also electrically coupled between the another terminal of the second coil and the second selection circuit; and
   a third low-pass filter electrically coupled between the another terminal of the third coil and the first selection circuit, and also electrically coupled between the another terminal of the third coil and the second selection circuit.

4. The zero-crossing detection circuit according to claim 1, wherein the first selection circuit and the second selection circuit output the third-terminal voltage and the first-terminal voltage respectively according to the selection signal in a first period and a fourth period; the first selection circuit and the second selection circuit output the second-terminal voltage and the third-terminal voltage respectively according to the selection signal in a second period and a fifth period; the first selection circuit and the second selection circuit output the first-terminal voltage and the second-terminal voltage respectively according to the selection signal in a third period and a sixth period; if the first selection circuit and the second selection circuit output the first-terminal voltage and the second-terminal voltage respectively in the first period, the second period, the third period, the fourth period, the fifth period and the sixth period, the comparing result presents the first-terminal voltage is larger than the second-terminal voltage in the first period, the second period and the third period, and presents the first-terminal voltage is less than the second-terminal voltage in the fourth period, the fifth period and the sixth period; if the first selection circuit and the second selection circuit output the second-terminal voltage and the third-terminal voltage respectively in the first period, the second period, the third period, the fourth period, the fifth period and the sixth period, the comparing result presents the second-terminal voltage is less than the third-terminal voltage in the first period, the second period and the sixth period, and presents the second-terminal voltage is larger than the third-terminal voltage in the third period, the fourth period and the fifth period; and if the first selection circuit and the second selection circuit output the third-terminal voltage and the first-terminal voltage respectively in the first period, the second period, the third period, the fourth period, the fifth period and the sixth period, the comparing result presents the third-terminal voltage is larger than the first-terminal voltage in the first period, the fifth period and the sixth period, and presents the third-terminal voltage is less than the first-terminal voltage in the second period, the third period and the fourth period.

5. The commutation device adapted into a three-phase brushless DC motor, the three-phase brushless DC motor comprising a first coil, a second coil and a third coil, a terminal of the first coil, a terminal of the second coil and a terminal of the third coil being electrically coupled together with each other, the commutation device comprising:
   a zero-crossing detection circuit, comprising:
      a first selection circuit electrically coupled to another terminal of the first coil, another terminal of the second coil and another terminal of the third coil, to obtain a first-terminal voltage, a second-terminal voltage and a third-terminal voltage respectively, and output one of the first-terminal voltage, the second-terminal voltage and the third-terminal voltage according to a selection signal;
      a second selection circuit electrically coupled to the another terminal of the first coil, the another terminal of the second coil and the another terminal of the third coil, to obtain the first-terminal voltage, the second-terminal voltage and the third-terminal voltage respectively, and output one of the first-terminal voltage, the second-terminal voltage and the third-terminal voltage according to the selection signal; and
      a comparator configured for comparing an output of the first selection circuit and an output of the second selection circuit, to output a comparing result; and
   a driving circuit electrically coupled to the another terminal of the first coil, the another terminal of the second coil and the another terminal of the third coil, to provide excitation currents of the first coil, the second coil and the third coil according to the comparing result.

6. The commutation device according to claim 5, wherein the zero-crossing detection circuit further comprises:
   a first low-pass filter electrically coupled between an output terminal of the first selection circuit and the comparator; and a second low-pass filter electrically coupled between an output terminal of the second selection circuit and the comparator.

7. The commutation device according to claim 5, wherein the zero-crossing detection circuit further comprises:
   a first low-pass filter electrically coupled between the another terminal of the first coil and the first selection circuit, and also electrically coupled between the another terminal of the first coil and the second selection circuit;
   a second low-pass filter electrically coupled between the another terminal of the second coil and the first selection circuit, and also electrically coupled between the another terminal of the second coil and the second selection circuit; and
   a third low-pass filter electrically coupled between the another terminal of the third coil and the first selection circuit, and also electrically coupled between the another terminal of the third coil and the second selection circuit.

8. The commutation device according to claim 5, wherein the first selection circuit and the second selection circuit output the third-terminal voltage and the first-terminal voltage respectively according to the selection signal in a first period and a fourth period; the first selection circuit and the second selection circuit output the second-terminal voltage and the third-terminal voltage respectively according to the selection signal in a second period and a fifth period; the first selection circuit and the second selection circuit output the first-terminal voltage and the second-terminal voltage respectively according to the selection signal in a third period and a sixth period; if the first selection circuit and the second selection circuit output the first-terminal voltage and the second-terminal voltage respectively in the first period, the second period, the third period, the fourth period, the fifth period and the sixth period, the comparing result presents the first-terminal voltage is larger than the second-terminal voltage in the first period, the second period and the third period, and presents the first-terminal voltage is less than the second-terminal voltage in the fourth period, the fifth period and the sixth period; if the first selection circuit and the second selection circuit output the second-terminal voltage and the third-terminal voltage respectively in the first period, the second period, the third period, the fourth period, the fifth period and the sixth period, the comparing result presents the second-terminal voltage is less than the third-terminal voltage in the first period, the second period and the sixth period, and presents the second-terminal voltage is larger than the third-terminal voltage in the third period, the fourth period and the fifth period; and if the first selection circuit and the second selection circuit output the third-terminal voltage and the first-terminal voltage respectively in the first period, the second period, the third period, the fourth period, the fifth period and the sixth period, the comparing result presents the third-terminal voltage is larger than the first-terminal voltage in the first period, the fifth period and the sixth period, and presents the third-terminal voltage is less than the first-terminal voltage in the second period, the third period and the fourth period.

* * * * *

UNITED STATES PATENT AND TRADEMARK OFFICE
CERTIFICATE OF CORRECTION

| | | |
|---|---|---|
| PATENT NO. | : 8,487,571 B2 | Page 1 of 1 |
| APPLICATION NO. | : 13/232086 | |
| DATED | : July 16, 2013 | |
| INVENTOR(S) | : Chang et al. | |

It is certified that error appears in the above-identified patent and that said Letters Patent is hereby corrected as shown below:

On the title page item [30], should read Foreign Application Priority Data --100121663

Signed and Sealed this
Eighteenth Day of March, 2014

Michelle K. Lee
*Deputy Director of the United States Patent and Trademark Office*